US005542654A

United States Patent [19]

Johanson

[11] Patent Number: 5,542,654

[45] Date of Patent: Aug. 6, 1996

[54] SELF-LOCKING RAILVICE GUIDED ALONG A T-SLOT

[76] Inventor: Lars Johanson, 72 Hillsdale Rd., Cedar Grove, N.J. 07009

[21] Appl. No.: 348,971

[22] Filed: Nov. 28, 1994

[51] Int. Cl.$^{6}$ ........ B23Q 3/02

[52] U.S. Cl. ........ 269/137

[58] Field of Search ........ 269/134–138, 269/99, 100, 91–94

[56] References Cited

U.S. PATENT DOCUMENTS

| | | | |
|---|---|---|---|
| 540,413 | 6/1895 | Vanderbeek | 269/137 |
| 2,411,059 | 11/1946 | Rubenstein | 269/136 |
| 2,569,239 | 9/1951 | Holmen . | |
| 2,780,123 | 2/1957 | Johanson . | |
| 2,992,665 | 8/1961 | Mertz . | |
| 3,512,769 | 5/1970 | Pendry et al. . | |
| 4,196,897 | 4/1980 | Gordon | 269/99 |
| 4,470,586 | 9/1984 | Spencer | 269/94 |
| 5,019,129 | 5/1991 | Johanson . | |
| 5,031,887 | 7/1991 | Johanson . | |
| 5,056,766 | 10/1991 | Engibarov . | |
| 5,199,693 | 4/1993 | Johanson . | |

FOREIGN PATENT DOCUMENTS

| | | | |
|---|---|---|---|
| 225606 | 2/1943 | Switzerland | 269/93 |
| 653083 | 3/1979 | U.S.S.R. | 269/91 |
| 1491645 | 7/1989 | U.S.S.R. | 269/137 |

OTHER PUBLICATIONS

EDM Today, Nov./Dec. 1993 Issue, p. 27.

EDM Today, Mar./Apr. 1993 Issue, pp. 35 and 59.

EDM Today, Nov./Dec. 1994 Issue, p. 20.

EDM Today, Jan./Feb. 1995 Issue, p. 33.

*Primary Examiner*—Robert C. Watson

*Attorney, Agent, or Firm*—Jacobson, Price, Holman & Stern, PLLC

[57] ABSTRACT

A railvice for use with a wire EDM, milling machine, or boring machine, having an elongated rail through which a T-slot extends longitudinally. A locking member of the railvice sits in the T-slot. A jaw element of the railvice connected to the locking member by a bolt includes a cavity for the locking member. The locking member has bias forces acting upon it to force the locking member towards the bottom of the T-slot as well as along the T-slot. The bolt externally anchored with respect to the locking member is rotated to cause the bias forces acting on the locking member to assist in either locking the locking member in the T-slot or forcing the locking member to the bottom of the T-slot for movement of the railvice along the T-slot.

18 Claims, 4 Drawing Sheets

SELF-LOCKING RAILVICE GUIDED ALONG A T-SLOT

Field Of The Invention

This invention relates to a self-locking railvice for holding large objects on a wire EDM machine.

BACKGROUND OF THE INVENTION

My four prior patents relate to workpiece holding systems which can be used with a wire EDM machine.

In my U.S. Pat. No. 5,031,887 a locking system for a precision vice is disclosed. The locking system includes a stationary jaw fixedly mounted on a laterally-extending base and a movable jaw adjustably mounted on the base for movement toward and away from the stationary jaw. The laterally-extending base includes a bottom recess and a longitudinal slot communicating with the bottom recess. A locking block is located in the recess and is secured to a clamp bolt extending upwardly from the locking block. The clamp bolt extends through the slot and through an inclined passageway in the movable jaw. The locking block includes serrations extending upwardly for engagement with the downwardly facing serrated surface of the base so as to lock the movable jaw in position when the locking block serrations are moved upwardly toward the serrations of the base by the clamp bolt.

In my U.S. Pat. No. 2,780,123 a precision vice having a co-acting locking plate and jaw-advancing screw is disclosed. The vice includes a fixed jaw and a movable jaw with the movable jaw being slidable on rails to a position where it contacts a workpiece which is then clamped against the workpiece and against the rails by rotating a single actuating device. The actuating device locks the movable jaw to the rail and brings the movable jaw into firm contacting relationship with the workpiece. The force applied to the movable jaw to hold it against the workpiece is applied at an angle passing downwardly toward the base of the vice and forwardly toward the fixed jaw of the vice so that there is no tendency for a front edge of the movable jaw to ride upwardly when it is clamped against the workpiece.

In operation, the movable jaw is manually slid toward the workpiece until it contacts the workpiece. A shaft in the movable jaw is then rotated such that a flange within the movable jaw tilts a locking element of the movable jaw in a slot of a base over which the movable jaw is moved. A locking surface of the locking element is thereby bound against spaced upper surfaces of the slot beneath ribs between which the movable jaw is slid. Further rotation of the shaft causes the movable jaw to move towards the stationary jaw. Forward movement of the movable jaw brings it into firm contact with the workpiece and holds the workpiece in place.

In my U.S. Pat. No. 5,019,129 another workpiece holding system is disclosed. This system utilizes vices of different sizes having a jaw arrangement which imparts downward force to a workpiece when the workpiece is clamped to hold the workpiece firmly against a precision supporting surface. The jaws are tapered or inclined upwardly and constructed to enable bending of the jaws to a position parallel to the workpiece surfaces with the jaws then remaining parallel regardless of the amount of pressure exerted by the vice on the workpiece. The vices include a dovetail recess in a surface opposite to the clamping jaws. A vertical extending dovetail adapter includes a dovetail of the same size as the dovetail in the vices to support vertically-spaced vices.

In my U.S. Pat. No. 5,199,693 a workpiece holding system with a lock screw is disclosed. The lock screw extends axially through a center of an adjustment screw utilized to adjust an adjustment block for holding a workpiece in an accurately adjusted position. Locking forces of the lock screw are exerted along a center of the adjustment screw to eliminate deflection of the adjustment block and resultant small errors which can occur due to such deflection.

SUMMARY OF THE INVENTION

The present invention relates to a railvice for use with a wire EDM, milling machine, or boring machine, having an elongated rail through which a T-slot extends longitudinally. A locking member sits in the T-slot. A jaw element connected to the locking member by a bolt includes a cavity for the locking member. The locking member has bias forces acting upon it to force the locking member towards the bottom of the T-slot as well as along the T-slot. The bolt externally anchored with respect to the locking member is rotated to cause the bias forces acting on the locking member to either lock the locking member in the T-slot or force the locking member to the bottom of the T-slot for movement of the railvice along the T-slot.

The invention includes a stationary jaw element located in the T-slot and a selectively slidable railvice disposed for selective movement along the T-slot towards the stationary jaw element. Alternatively, two slidable railvices located at opposite ends of the T-slot are movable towards each other to clamp a workpiece and force the workpiece downwardly towards the upper surface of the rail or work support within which the T-slot is formed.

The locking member of the selectively slidable railvice includes an upper portion which slides along the upper surface of the rail and an inverted T-shaped lower portion which slides in the T-slot of the rail. The inverted T-shaped lower portion includes a vertical element and two wing elements extending laterally therefrom. Each wing element includes a region of increasing thickness located at a trailing edge of the wing elements. The vertical element extends above the upper surface of the rail and, with the upper portion of the locking member, is received in a cavity of the slidable jaw element. The upper portion of the locking member includes a cylindrical cavity which contains a cylindrical nut. The cylindrical nut is pivotable with respect to the upper portion of the locking member.

An obliquely arranged bolt passes partially through the upper portion of the slidable jaw element and also passes through the upper portion of the locking member for threaded engagement with the cylindrical nut. When the bolt is turned in a first direction, the threaded connection between the cylindrical nut and the bolt causes the lower portion of the locking member to tilt with respect to the upper portion. When this occurs, the regions of increased thickness in the wing elements of the locking member are also tilted and consequently bite into the horizontal walls of the T-slot. This, in turn, securely locks the otherwise slidable locking member in place.

When the bolt is turned in an opposite direction, a spring urges the jaw element and the locking member apart from one another with the wing elements moved to a substantially parallel orientation with respect to the horizontal surfaces of the T-slot. This, in turn, releases the slidable locking member and thus permits sliding of the locking member longitudinally along the T-slot.

The jaw element includes a resiliently disposed surface for engaging workpieces disposed between the slidable jaw element and the stationary jaw element or alternatively between the slidable jaw elements. Each of the resiliently disposed surfaces tapers away from the workpiece as the distance from the upper surface of the work support increases. In addition, a V-shaped attachment may be provided for accommodating round or hexagonal workpieces.

Accordingly, it is the primary object of the present invention to provide at least one novel railvice for clamping a workpiece on a work support by the engagement of a locking member of the railvice in a T-shaped slot.

It is another object of the present invention to provide at least one railvice alternatively slidable along a T-shaped slot of a work support and lockable in the T-shaped slot of the work support as controlled by rotation of a bolt passing through a jaw element and a locking member of the railvice.

It is yet another object of the present invention to provide at least one railvice including a jaw element and a locking member with the locking member being received within a cavity of the jaw element and being slidable along a T-shaped slot of a work support with the locking member being subject to bias forces for controlling the sliding or locking of the railvice dependent upon the direction of rotation of a bolt extending through the jaw element into the locking member.

It is still yet another object of the present invention to provide at least one railvice on a work support mounted in a T-shaped slot for clamping a workpiece and forcing the workpiece down towards the work support dependent upon the rotation of a bolt extending through a jaw element and into a locking member of the railvice.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
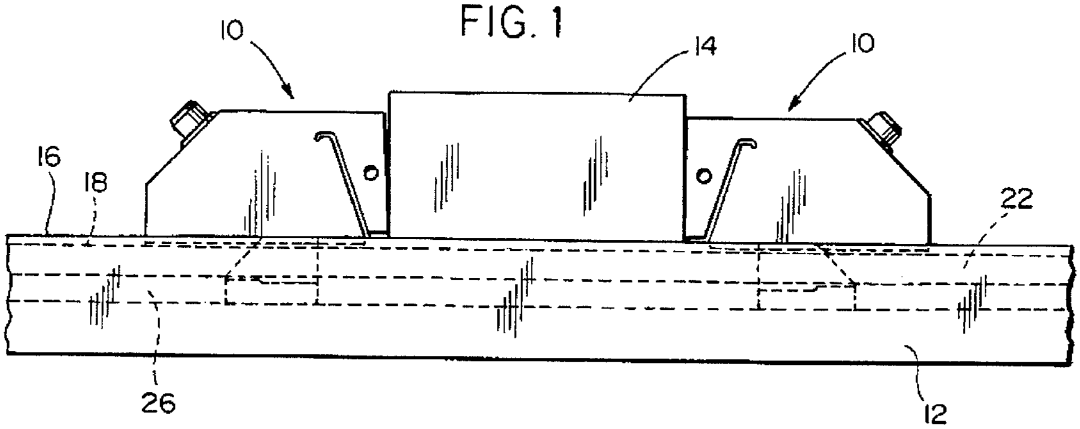
FIG. 1 is a side elevational view of two slidably mounted jaw elements mounted on a rail having an inverted T-shaped slot in a work support surface for holding a workpiece on a wire EDM machine in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
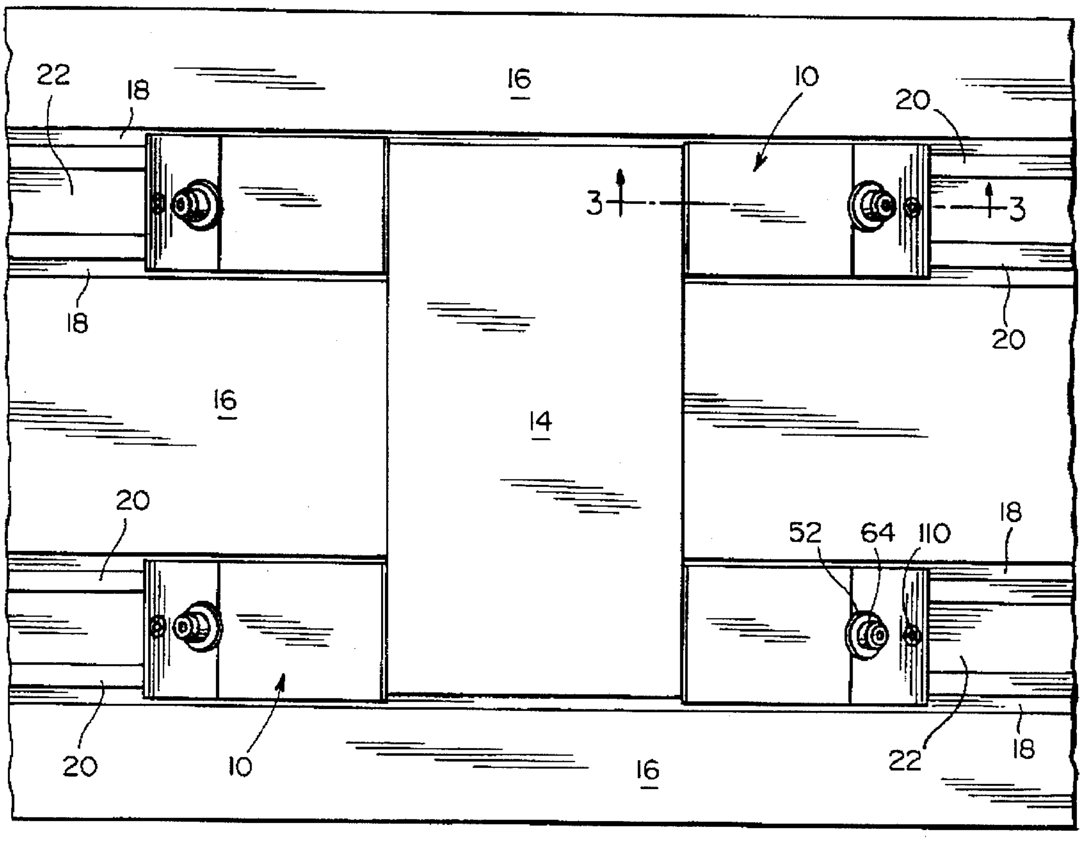
FIG. 2 is a plan view illustrating two sets of slidable jaw elements mounted on two rails having inverted T-shaped slots in a work support surface in accordance with the present invention.

With reference to the drawings, in general, and to FIGS. 1 and 2, in particular, a self-locking railvice embodying the teachings of the subject invention is generally designated as 10. With reference to its orientation in FIG. 1, the railvices 10 are slidably mounted on a work support 12 to clamp a workpiece 14. Alternatively, it is understood as being within the scope of the present invention that one of the two railvices shown in FIG. 1 could be a fixed vice member mounted in the work support and only one movable railvice is employed to clamp the workpiece.

Figure 5:
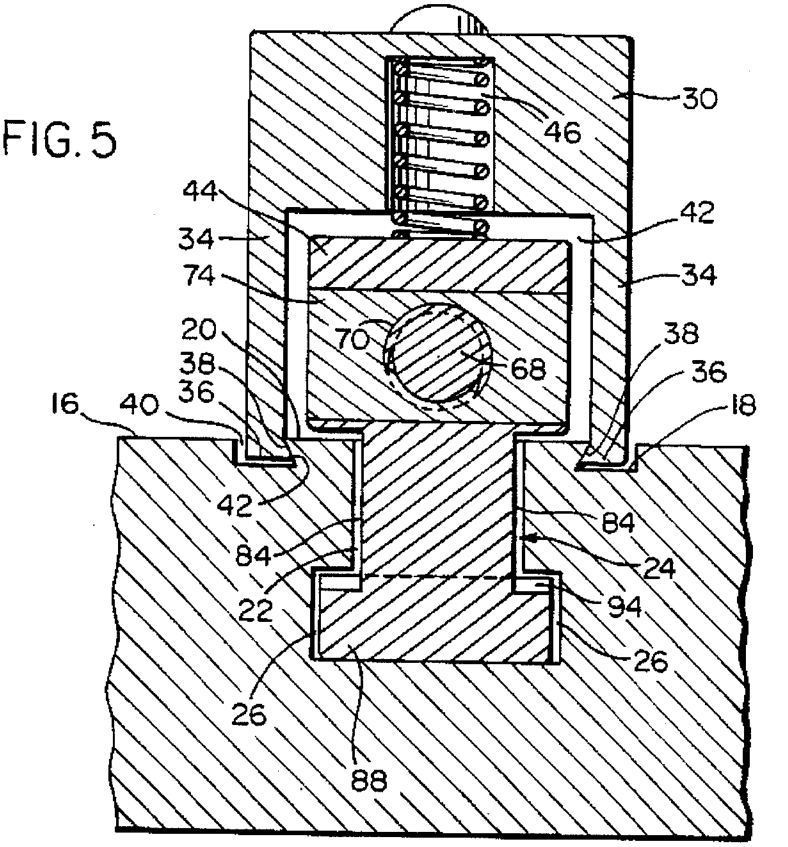
FIG. 5 is a sectional view taken along line 5—5 of FIG. 3.
Figure 6:
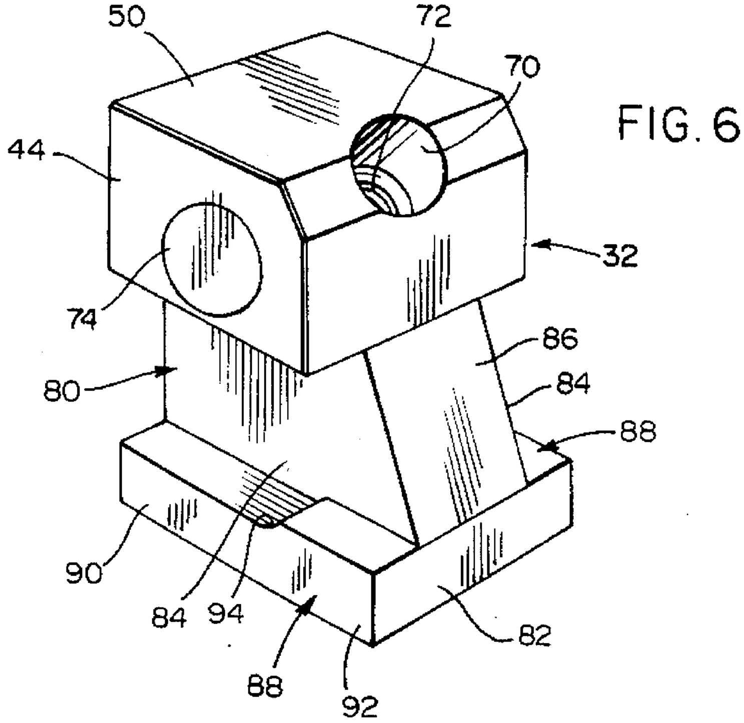
FIG. 6 is a perspective view of a locking member in accordance with the present invention.

In FIG. 2, two rails 12 are shown recessed from a work surface 16 of the work support 12. As shown in FIG. 5, each rail includes two recessed channels 40 terminating in bottom surfaces 18. Spaced inwardly from the channels 40 and surfaces 18 are surfaces 20 in the same plane as work surfaces 16. Located centrally between the two surfaces 20 is a channel 22 forming part of an inverted T-shaped slot 24. At the bottom of channel 20, the slot 24 includes two lateral wing recesses 26 to complete the inverted T-shape of the slot 24.

With reference to FIGS. 3 through 6, the railvice 10 includes a jaw element 30 and a locking member 32. Jaw element 30, as shown in FIG. 5, includes two support legs 34 terminating in tenon-shaped feet 36, each having an inwardly tapering inclined surface 38. These feet 36 are slidably mounted in channel 40 located in upper surface 16 which terminates at a lowermost surface in bottom surface 18.

Channel 40 includes an outwardly tapering surface 42 which is inclined complementary to inwardly tapering surface 38 to allow for sliding of the jaw element 30 along surface 16. Channel 40 is mortise shaped for receiving the tenon-shaped feet 36 of the support legs 34.

Located between the support legs 34 of the jaw element 30 is a cavity 42 for receipt of an upper portion 44 of the locking member 32. A recess 46 of the jaw element 30 includes a coil spring 48 which engages an upper surface 50 of the upper portion 44 of the locking member so as to bias the locking member in a downward direction.

The jaw element 30 includes a semi-circular, slidably mounted holder 52 through which a smooth surface portion 54 of a bolt 56 passes at an angle of preferably approximately 45°. The bolt is rotatably mounted through a cylindrical passage 58 defined in the holder 52. The head of the bolt 56 includes a shoulder 60 for resting on the holder 52. A recess 62 in the head 64 of the bolt 56 is shaped for receipt preferably of an allen wrench for rotation of the bolt 56.

The smooth surface section 54 of the bolt 56 passes through a passageway 66 of the jaw element 30 which tapers outwardly along the length of smooth surface section 54, increasing in diameter in a direction from the head 64 to a threaded section 68 of the bolt 56. The threaded portion 68 passes through a cylindrical passageway 70 formed in the upper portion 44 of the locking member 32. The threaded portion is engaged in a threaded passageway 72 of a cylindrical member 74. The cylindrical member 74 is pivotally mounted in the sidewalls of the upper portion 44 of the locking member 32. The threaded passageway 72 acts a pivotable nut and extends perpendicular to a longitudinal axis of the cylindrical member 74. The terminal end 76 of the threaded portion 68 extends through the cylindrical member 74 and into a cylindrical passageway 78 to allow extension of the threaded portion by rotation of the bolt 56.

The locking member 32 further includes a central portion 80 and a bottom portion 82. The central portion 80 includes sidewalls 84 which are spaced apart a distance for freely moving within the channel 22 of T-slot 24. A trailing surface 86 of central portion 80 is inclined preferably at an approximately 45° angle.

The lowermost or bottom portion 82 of the locking member 32 includes two laterally extending wings 88 for sliding within the lateral wing recess 26 of the T-shaped slot 24. The height of the leading portion 90 of the wings is considerably less than the height between the horizontal surfaces of the lateral wing recess 26. As the leading portion 90 approaches a trailing portion 92 of the wings 88, an arcuate surface 94 leads up to the trailing portion 92 which is of a height only slightly less than the height between the horizontal surfaces of the lateral wing recess 26.

Extending from an angled surface 96 of jaw element 30 is a passageway 98 which includes a threaded section 100 and a cylindrical section 102. In the cylindrical section, a terminal end 104 of a plunger 106 is slidably mounted. A spring 108 biases the plunger 106 towards the inclined surface 86 of the locking member 32. A set screw 110 is located in the threaded portion 100 of the passageway 98. The set screw 110 includes a recess 112 for receipt of preferably an allen wrench for rotating the set screw 110 and thereby increasing the pressure of spring 108 on end 104 of plunger 106.

Figure 3:
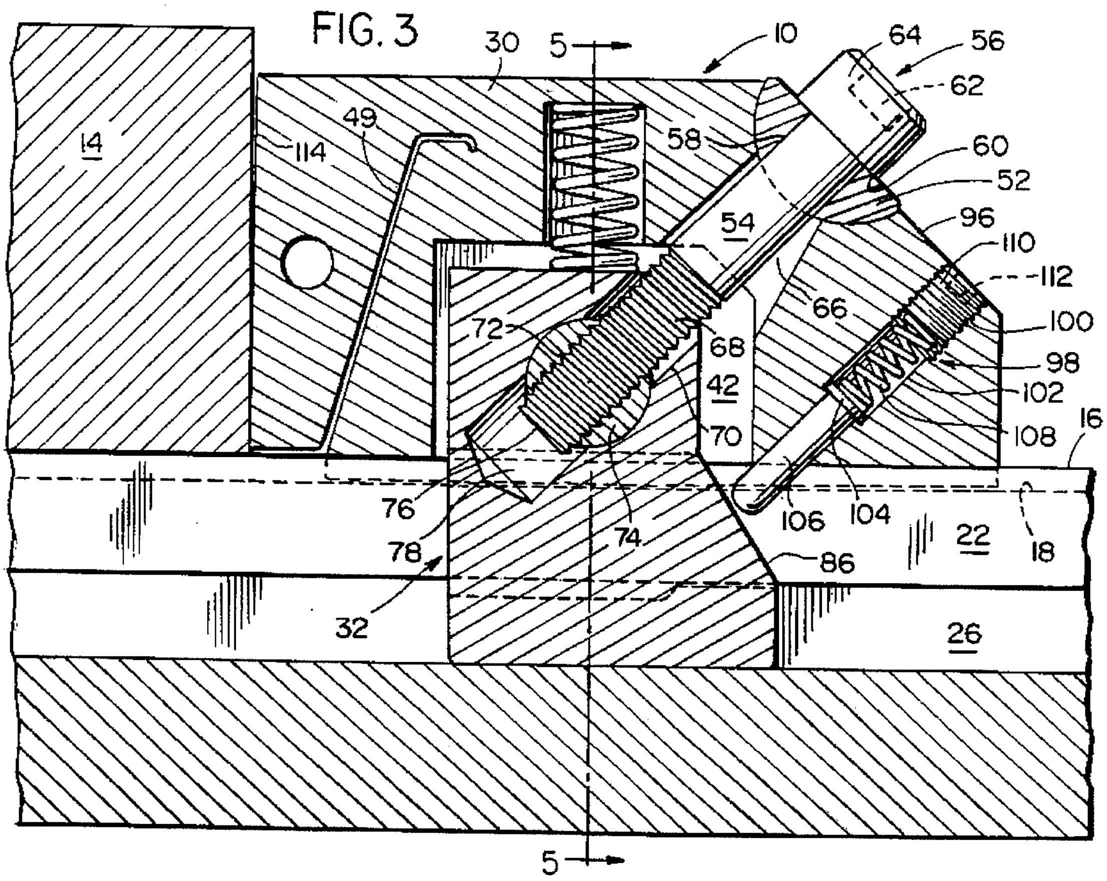
FIG. 3 is a sectional view of a slidable railvice taken along line 3—3 of FIG. 2.

In operation, when bolt 56 is rotated counter-clockwise, locking member 30 is moved to the left as shown in FIG. 3 in a direction away from plunger 106. Meanwhile, spring 48 pushes locking member 32 towards the bottom of T-shaped slot 24. The jaw element 30 is thereby released to be able to slide freely back and forth in the T-shaped slot 24 and along the work surface 16.

Figure 4:
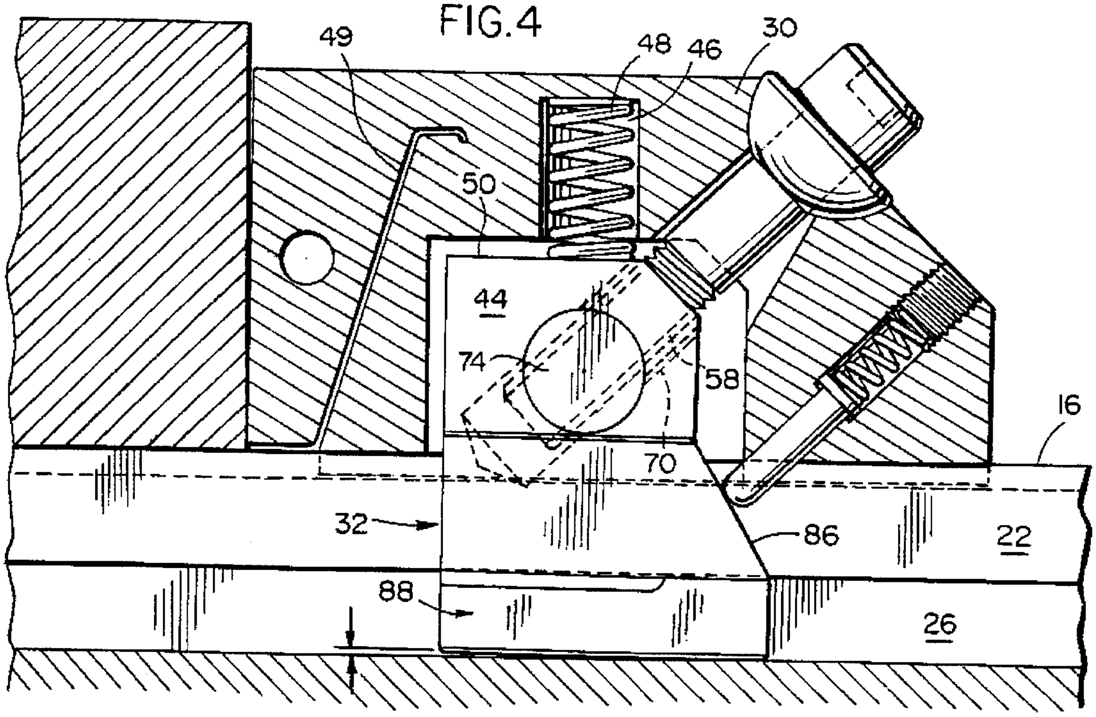
FIG. 4 is a partial sectional view illustrating a railvice in a locked position due to the tilting of an inverted T-shaped lower portion of the locking member in accordance with the present invention.

However, when bolt 56 is rotated in a clockwise direction, the threaded portion 68 of bolt 56 rotating in threaded passageway 72 will draw the locking member 30 towards the right as shown in FIG. 3. Pressure is applied against surface 86 by the plunger 106 due to the bias force of spring 108. Plunger 106 will be forced in a direction of retraction into passageway 98 while simultaneously causing the locking member to tilt upwardly as shown in FIG. 4 by an amount designated by the letter "a" which is in the range of 1° to 3° and which may be preferably as little as a 1° tilt. The locking member is thereby tilted with the upper surface of the trailing portion 92 tilted upwardly into contact with the upper horizontal surface of lateral wing recesses 26 and the lower surface of the trailing portion 92 tilted downwardly into contact with the lower horizontal surface of lateral wing recesses 26. The locking member will thereby be frictionally locked within the T-shaped slot 24.

Further rotation of the bolt 56 in a clockwise direction will move the jaw element 30 to the left as shown in FIG. 4 against the workpiece 14. The slight canting of the front surface 114 of the jaw element 30 will be removed by compression of slot 49 to force the contacted workpiece 14 down towards the surface 16.

The force exerted by spring 48 is considerably less than the force exerted by spring 108 so that the locking member is caused to tilt and thereby lock the locking member in the T-shaped slot 24 due to the increased resistance of the plunger 106 against the spring 108 as compared to the downward force on the locking member 32 by spring 48. The only force locking the locking member in place is the frictional engagement of the trailing portion 92 with the upper and lower horizontal surfaces of the lateral wing recesses 26. By frictional engagement and release between the locking member and the T-shaped slot, the jaw element is adjustable to any position along the T-shaped slot, not being limited to any preset lock positions as dictated by interlocking serrations or any other means for locking.

In operation, a workpiece is positioned against a stationary jaw element, either fixed or integral with a work support. A selectively slidable railvice of the present invention is slid along T-shaped slot 24 until engaging a vertical side of a workpiece 14 as shown in FIG. 3. Bolt 56 is then rotated clockwise to move jaw locking member 32 into engagement with plunger 106. The locking member 32 is thereby tilted within T-shaped slot 24.

The continued clockwise rotation of bolt 56 causes the jaw element 30 to slide into compressed engagement with the workpiece 14 by pivoting of the holder 52 within a complementary-shaped recess of the jaw member 30. The initial compression of the leading surface 114 of the draw member 30 against the workpiece 14 is alleviated by the compression of slot 49, formed in the jaw member 30. The continued force of rotation of the bolt 56 causes a secure locking of the workpiece 14 in position.

Upon rotation of the bolt 56 in a counter-clockwise direction, the jaw element is caused to move away from the workpiece 14 and in a direction to the right of the locking member 32. The plunger 106 is then removed from engagement with the inclined surface 86 of the locking member 32 as shown in FIG. 3. The force of spring 48 then forces the locking member 32 downwardly within the T-shaped slot 24 to allow free sliding of the locking member 32 in the T-shaped slot. The railvice may then be manually slid away from the workpiece 14 for removal of the workpiece.

Figure 7:
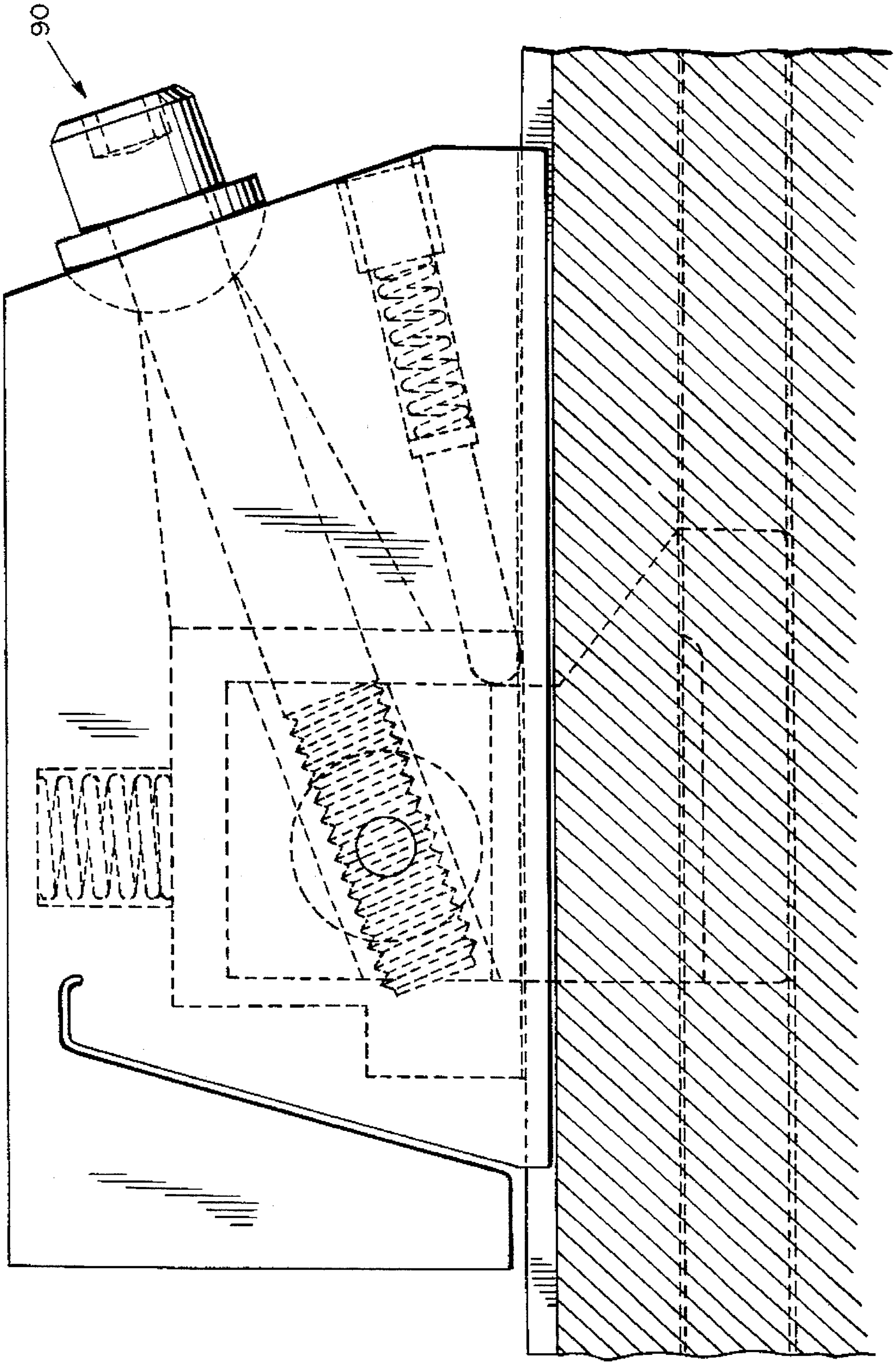
FIG. 7 is a sectional view of an alternative railvice for use when two opposed sliding railvices are used for small workpieces, as in FIGS. 1 and 2, as contrasted with a slidable railvice with an opposed fixed vice.

In FIG. 7, a bolt. 90 is shown which is similar to bolt 56 shown in FIGS. 3 and 4. Bolt 90 extends at an angle of 20 to 25°, and preferably at an angle of 21°. Otherwise, bolt 90 operates as bolt 56. The lower angle of bolt 90 provides less interference when sliding the railvice for securing smaller workpieces.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A clamping system for a workpiece, said clamping system comprising:

a work support having a work surface, an inverted T-shaped slot extending into said work support from said work surface, at least one railvice including a jaw element for engaging the workpiece and holding the workpiece in position and a locking member slidably mounted in said slot, rotation means extending through said jaw element and engaging said locking member for locking and releasing said locking member in said slot, and bias means for biasing said locking member in a locked or released position in said slot depending upon rotation of said rotation means in either direction, said bias means tilting said locking member in one direction of rotation of said rotation means and moving said locking member downwardly in an opposite direction of rotation of said rotation means.

2. A clamping system according to claim 1, wherein said T-shaped slot includes a vertical channel and two laterally extending wing recesses extending from said channel and said locking member engages horizontal surfaces of said two wing recesses to lock said locking member in said slot.

3. A clamping system according to claim 1, wherein said rotation means threadingly engages said locking member.

4. A clamping system according to claim 1, wherein said locking member includes a lower portion of an inverted T-shape.

5. A clamping system according to claim 4, wherein said locking member includes two laterally extending wings.

6. A clamping system for a workpiece, said clamping system comprising:

a work support having a work surface, a slot extending into said work support from said work surface, at least one railvice slidably mounted in said slot, said at least one railvice including a jaw element and a locking member, connecting means for connecting said jaw element and said locking member and for locking and releasing said locking member in said slot, and bias means for biasing said locking member dependent upon either direction of rotation of said connecting means for assisting in locking and releasing said locking member in said slot, said bias means including two springs.

7. A clamping system according to claim 6, wherein said connecting means is a threaded bolt.

8. A clamping system according to claim 7, wherein said locking member includes a nut for receiving said bolt.

9. A clamping system according to claim 6, wherein said slot is an inverted T-shape, and includes a vertical channel and two laterally extending wing recesses extending from said channel and said locking member engages horizontal surfaces of said two wing recesses to lock said locking member in said slot.

10. A clamping system according to claim 9, wherein said locking member includes two laterally extending wings.

11. A clamping system comprising:

a work support, a jaw fixed on said work support, a slot extending into said work support, a railvice slidably mounted in said slot, means for locking and releasing said railvice in said slot, and bias means for biasing said railvice for assisting in locking and releasing said railvice in said slot as controlled by said means for locking and releasing, said bias means including two springs.

12. A clamping system according to claim 11, wherein said railvice includes a jaw element and a locking member and said means for locking and releasing connects said jaw element and said locking.

13. A clamping system for a workpiece, said clamping system comprising:

a work support having a work surface, a slot extending into said work support from said work surface, at least one railvice slidably mounted in said slot, said at least one railvice including a jaw element and a locking member, connecting means for connecting said jaw element and said locking member and for locking and releasing said locking member in said slot, and bias means for biasing said locking member dependent upon either direction of rotation of said connecting means for assisting in locking and releasing said locking member in said slot, said bias means including a plunger for engaging said locking member and tilting said locking member to lock said railvice in said slot and a spring for moving the locking member downwardly into said slot for sliding of said railvice.

14. A clamping system according to claim 13, wherein said connecting means is a threaded bolt.

15. A clamping system according to claim 14, wherein said locking member includes a nut for receiving said bolt.

16. A clamping system according to claim 13, wherein said slot is an inverted T-shape and includes a vertical channel and two laterally extending wing recesses extending from said channel and said locking member engages horizontal surfaces of said two wing recesses to lock said locking member in said slot.

17. A clamping system according to claim 16, wherein said locking member includes two laterally extending wings.

18. A clamping system for a workpiece, said clamping system comprising:

a work support having a work surface, a slot extending into said work support from said work surface, at least one railvice slidably mounted in said slot, said at least one railvice including a jaw element and a locking member, a bolt assembly for connecting said jaw element and said locking member, and a spring assembly for tilting said locking member so that an upper and a lower surface of said locking member engage a top and a bottom surface, respectively, of a portion of said slot to thereby lock said locking member in said slot and a spring assembly for biasing said locking member away from engagement with said top surface of said portion of said slot so that said locking member is slidable in said slot.

* * * * *